(12) United States Patent
Fandrianto et al.

(10) Patent No.: US 9,237,240 B2
(45) Date of Patent: Jan. 12, 2016

(54) COMMUNICATIONS MANAGEMENT AND GATEWAY BYPASSING SYSTEM (71) Applicant: Obihai Technology, Inc, Campbell, CA (US)

(72) Inventors: Jan Fandrianto, Los Gatos, CA (US); Sam Sin, San Jose, CA (US)

(73) Assignee: Obihai Technology, Inc., Campbell, CA (US)

( * ) Notice: Subject to any disclaimer, the term of this patent is extended or adjusted under 35 U.S.C. 154(b) by 105 days.

(21) Appl. No.: 14/066,593

(22) Filed: Oct. 29, 2013

(65) Prior Publication Data

US 2015/0117623 A1 Apr. 30, 2015

Related U.S. Application Data

(60) Provisional application No. 61/725,894, filed on Nov. 13, 2012.

(51) Int. Cl.
*H04M 7/00* (2006.01)
(52) U.S. Cl.
CPC .......... *H04M 7/0069* (2013.01); *H04M 7/0051* (2013.01)
(58) Field of Classification Search
CPC .................... H04M 7/0069; H04M 7/0051
See application file for complete search history.

(56) References Cited

U.S. PATENT DOCUMENTS

| 2009/0222577 A1* | 9/2009 | Goodman | H04L 29/125 709/238 |
| 2012/0303825 A1* | 11/2012 | Xie | H04L 29/12009 709/228 |
| 2013/0156041 A1* | 6/2013 | Vangala | H04L 61/2585 370/401 |

\* cited by examiner

*Primary Examiner* — Melvin Marcelo
(74) *Attorney, Agent, or Firm* — James Cai; SAC Attorneys LLP (57) ABSTRACT

A method and a system for detecting presence of an application layer gateway (ALG) in a network path between an analog telephone adapter and a communications service provider (CSP), and transmitting a media message by bypassing the (ALG) are provided. A communication management application (CMA) detects, processes, and augments the media message sent by a first user device to a second user device. A message relay server (MRS) processes and manages the media message. The CMA receives the media message from the first user device and detects the presence of the ALG using a message echo server. The CMA scrambles the media message and transmits the scrambled media message to the MRS via a network. The ALG is bypassed due to non-recognition of the scrambled media message. The MRS unscrambles the scrambled media message and transmits the unscrambled media message to the CSP for forwarding to the second user device.

15 Claims, 6 Drawing Sheets

COMMUNICATIONS MANAGEMENT AND GATEWAY BYPASSING SYSTEM

CROSS REFERENCE TO RELATED APPLICATIONS

This application claims the benefit of provisional patent application No. 61/725,894 titled "Method to Bypass SIP ALG for VoIP ATA Devices", filed in the United States Patent and Trademark Office on Nov. 13, 2012.

The specification of the above referenced patent application is incorporated herein by reference in its entirety.

BACKGROUND

Consumer voice over internet protocol (VoIP) services offered by many communications service providers, for example, internet telephony service providers (ITSPs) are established by installing an analog telephone adapter at a subscriber's premises. The analog telephone adapter bridges an analog telephone, for example, a plain old telephone system (POTS) phone to the internet by exchanging signaling messages and media data such as audio data with the communications service providers. To use the VoIP service, the subscriber has to just pick up the POTS phone to make and receive calls in a manner similar to a conventional home phone service.

A session initiation protocol (SIP) is a typical VoIP signaling protocol with a message format similar to the hypertext transfer protocol (HTTP). While the SIP may be transported securely over a transport layer security (TLS) protocol and/or a secure sockets layer (SSL) protocol, most communications service providers transport the SIP over a user datagram protocol (UDP) or a transmission control protocol (TCP). In the SIP, the transport addresses for communication between peers or users are embedded in signaling messages. A transport address is an internet protocol (IP) address: port combination where packets or messages are sent from or received at a peer. The transport address is of two types, for example, a public transport address and a private transport address. Users anywhere in the world can send packets to a public transport address. Only users in the same private network can send packets to a private transport address. Each user is required to indicate his/her transport address to another user for sending signaling messages and media data to each other.

An analog telephone adapter typically connects to a network via a home router. The analog telephone adapter indicates private transport addresses in session initiation protocol (SIP) messages. The home router replaces the private transport addresses in the IP header of the packets carrying these SIP messages with corresponding public transport addresses through network address translation (NAT), before the SIP messages are forwarded. Many home routers also have a gateway which is a network node equipped for interfacing a communications network with another communications network that uses different protocols. The gateway, for example, a SIP application layer gateway (ALG) is configured to augment VoIP signaling or SIP through the NAT. The SIP ALG replaces the private transport addresses in the SIP messages with corresponding public transport addresses before forwarding the SIP messages. The modified SIP messages appear to be corrupted if the SIP ALG is incorrectly configured and are therefore dropped by the communications service provider. Moreover, the communications service provider may be misled into believing that the analog telephone adapter is connected directly to the internet without a NAT and handles the SIP message differently, causing a communication breakdown between the analog telephone adapter and the communications service provider.

With conventional analog telephone adapter devices, communications service providers spend a lot of time diagnosing session initiation protocol (SIP) application layer gateway (ALG) related issues reported by their subscribers. To resolve this, the subscribers are advised to disable the SIP ALG option in the home router settings, or to replace the home router with a router that does not have the SIP ALG feature, or to disable the SIP ALG feature by reconfiguring the home router. However, reconfiguration is an expensive option for the communications service provider to support subscribers. Sometimes, frustrated subscribers may decide to drop the service of the communications service provider altogether. Hence, there is a need for an analog telephone adapter that can detect whether an ALG, for example, the SIP ALG exists in the path between the analog telephone adapter and the communications service provider, or assist the communications service provider to detect the presence of the SIP ALG, and that can bypass the SIP ALG.

The presence of the session initiation protocol (SIP) application layer gateway (ALG) in home routers creates a major support issue for communications service providers, and many diagnostic steps are required before a trouble-ticket can be diagnosed as a SIP ALG problem. Conventional analog telephone adapter devices can neither detect the presence of the SIP ALG nor bypass the ALG in a network path between the analog telephone adapter and the communications service provider. These conventional analog telephone adapter devices cannot explicitly inform the communications service provider whether the SIP ALG exists in the network path between the analog telephone adapter and the communications service provider. These analog telephone adapters also do not offer a feasible way to bypass the SIP ALG if the SIP ALG is indeed present in the network path. To apply itself, the ALG must first recognize that the received media message is an SIP message. Although a few conventional analog telephone adapter devices may in effect bypass the ALG by transporting the SIP over a secure channel, such a solution is impractical to most commercial communications service providers as this solution requires a major equipment upgrade. Hence, there is a need for a method and a system that detects the presence of the SIP ALG and bypasses the ALG without requiring the communications service providers to upgrade their equipment, or without replacing and/or reconfiguring subscribers' home routers.

Hence, there is a long felt but unresolved need for a method and a system that detects the presence of an application layer gateway (ALG), for example, a SIP ALG in a network path between the analog telephone adapter and the communications service provider. Moreover, there is a need for a method and a communications management system that transmits a media message by bypassing the ALG in the network path between the analog telephone adapter and the communications service provider.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above stated needs for detecting the presence of an application layer gateway (ALG) in a network path between an analog telephone adapter and a communications service provider. As used herein, the term "application layer gateway" refers to a voice over internet protocol (VoIP) signaling application layer gateway, for example, a session initiation protocol (SIP) application layer gateway (ALG) that augments a network address translation (NAT) employed in a network such as a computer network. In computer networking, NAT is a process of modifying internet protocol (IP) address information in IPv4 headers while forwarding, for example, SIP messages across a network path. Also, as used herein, the term "communications service provider" refers to a consumer VoIP service provider, for example, an internet telephony service provider that provides an internet data service for making calls using VoIP technology and manages voice communications and multimedia sessions over internet protocol (IP) networks such as the internet. The analog telephone adapter is a device used to connect one or more standard analog telephones to a digital telephone system, for example, a VoIP system or a non-standard telephone system. Moreover, the method and the communications management system disclosed herein transmit a media message by bypassing the ALG, that is, the SIP ALG in the network path between the analog telephone adapter and the communications service provider. Furthermore, the method for detecting the presence of the SIP ALG in the network path between the analog telephone adapter and the communications service provider can be incorporated into any analog telephone adapter or a similar device to allow the analog telephone adapter or the similar device to bypass the SIP ALG.

The method and the system disclosed herein provide a communication management application in the analog telephone adapter. The communication management application is executable by at least one processor configured to detect, process, and augment one or more media messages sent by a first user device to a second user device via the communications service provider along the network path. As used herein, the term "media message" refers to a communications message or a session initiation protocol (SIP) message, for example, a voice message, a fax, a short message service (SMS) message, etc., sent from a first user device to a second user device. Also, as used herein, the term "first user device" refers to an analog telephone device, for example, a plain old telephone system (POTS) connected to a telephone network such as a wired telephony network, a wireless network, a voice call network, etc. Also, as used herein, the term "second user device" refers to a linear electronic device or a non-linear electronic device, for example, a personal computer, a tablet computing device, a mobile computer, a mobile phone, a smart phone, a portable computing device, a laptop, a personal digital assistant, a touch centric device, a workstation, a client device, a portable electronic device, a network enabled computing device, an interactive network enabled communication device, any other suitable computing equipment, and combinations of multiple pieces of computing equipment, etc.

The analog telephone adapter is in operative communication with the first user device via a telephone network. The analog telephone adapter is also in operative communication with the communications service provider via a network, for example, the internet. The method and the system disclosed herein also provide a message echo server comprising at least one processor configured to process and scramble a communications protocol message. The communications protocol message is configured to detect the presence of the application layer gateway (ALG) in the network path between the analog telephone adapter and the communications service provider. As used herein, the term "communications protocol message" refers to a signaling message, for example, a plain SIP message such as INVITE or REGISTER. The message echo server is, for example, an echo server configured to test and measure round trip times in internet protocol (IP) networks. The message echo server is in operative communication with the communication management application in the analog telephone adapter via the network.

The communication management application transmits the communications protocol message in the analog telephone adapter to the message echo server via the network for scrambling the communications protocol message. The communications protocol message comprises a transport address for identifying the first user device. As used herein, the term "transport address" refers to an address, for example, an IP address used to label a user device such as a computer or a printer participating in a computer network that uses the internet protocol for communication purposes. The transport address is used to identify a network interface and also for location addressing. The message echo server scrambles the transmitted communications protocol message using a scrambling algorithm. The message echo server then transmits the scrambled communications protocol message to the communication management application in the analog telephone adapter via the network. The communication management application in the analog telephone adapter receives the scrambled communications protocol message from the message echo server via the network and unscrambles the received communications protocol message using an unscrambling algorithm. The communication management application in the analog telephone adapter compares the transport address of the unscrambled communications protocol message with the transport address of the original communications protocol message. The communication management application in the analog telephone adapter detects the presence of the application layer gateway (ALG) in the network path between the analog telephone adapter and the communications service provider, when the comparison of the transport address of the unscrambled communications protocol message with the transport address of the original communications protocol message results in a mismatch.

Also, disclosed herein are a method and a system for transmitting a media message by bypassing the application layer gateway (ALG) in the network path between the analog telephone adapter and the communications service provider. The method and the system disclosed herein provide a message relay server comprising at least one processor configured to process and manage one or more media messages sent between the analog telephone adapter and the communications service provider via the network. The message relay server provides a message relaying service for enabling secure, load balanced communication between communication devices through the network. The communications service provider is in operative communication with the second user device. The communication management application in the analog telephone adapter receives the media message sent from the first user device. In an embodiment, when the communication management application in the analog telephone adapter receives the media message, the communication management application sends a communications protocol message to the message echo server to detect whether the ALG is present in the network path between the analog telephone adapter and the communications service provider.

If the application layer gateway (ALG) is detected, then the communication management application in the analog telephone adapter scrambles the received media message using a scrambling algorithm. The communication management application embeds a relay header in the received media message. The relay header indicates a destination transport address for identifying the second user device. In an embodiment, the communication management application in the analog telephone adapter augments the media message by including checksums in the media message. The checksum also referred to as hash sum is a small size datum computed from an arbitrary block of digital data for detecting errors that may have been introduced during transmission or storage of the media message. The communication management application adds checksums to the media message to facilitate detection of a modification of the media message due to the presence of the ALG in the network path between the analog telephone adapter and the communications service provider by the communications service provider.

The communication management application in the analog telephone adapter transmits the scrambled media message to the message relay server via the network. The application layer gateway (ALG) in the network path between the analog telephone adapter and the message relay server is bypassed due to non-recognition of the scrambled media message by the ALG. The message relay server unscrambles the scrambled media message. The message relay server removes the relay header embedded in the scrambled media message. The message relay server then transmits the unscrambled media message to the communications service provider for forwarding the unscrambled media message to the second user device. In an embodiment, the communication management application in the analog telephone adapter optionally authenticates the analog telephone adapter to the message relay server prior to forwarding of the media message to the second user device by the message relay server.

In another embodiment, when the communications service provider returns a media message to the first user device, the message relay server receives the media message sent by the communications service provider. The message relay server scrambles the received media message using a scrambling algorithm. The message relay server embeds a relay header in the received media message. The relay header indicates a destination transport address for identifying the first user device. The message relay server transmits the scrambled media message to the communication management application in the analog telephone adapter via the network. In an embodiment, the communication management application in the analog telephone adapter optionally authenticates the analog telephone adapter to the message relay server prior to transmission of the scrambled media message to the communication management application in the analog telephone adapter by the message relay server. The application layer gateway (ALG) in the network path between the analog telephone adapter and the message relay server is bypassed due to non-recognition of the scrambled media message by the ALG. The communication management application in the analog telephone adapter unscrambles the scrambled media message using an unscrambling algorithm. The communication management application also removes the relay header embedded in the scrambled media message. The communication management application in the analog telephone adapter then transmits the unscrambled media message to the first user device.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
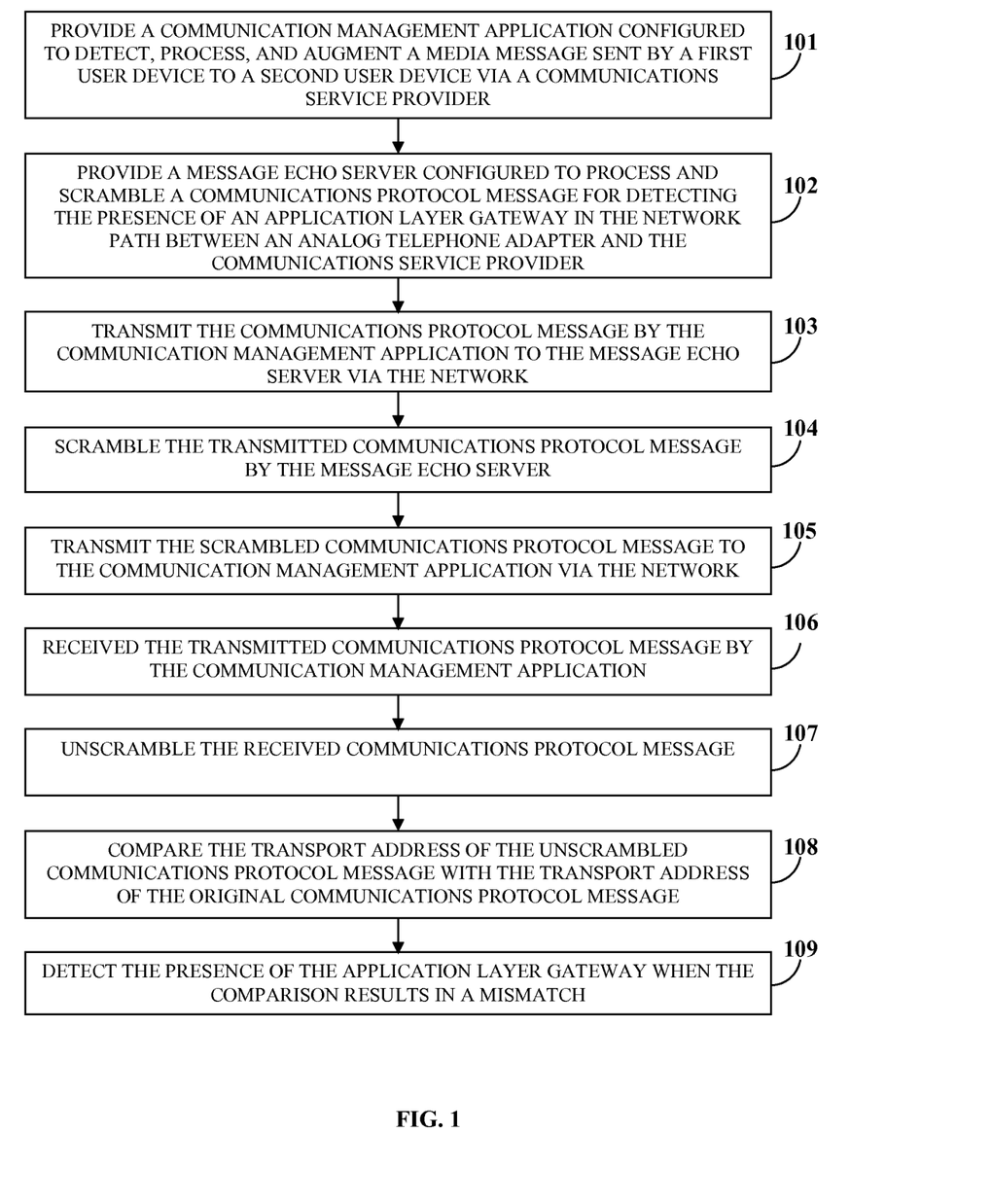
FIG. 1 illustrates a method for detecting presence of an application layer gateway in a network path between an analog telephone adapter and a communications service provider.

FIG. 1 illustrates a method for detecting presence of an application layer gateway in a network path between an analog telephone adapter and a communications service provider. As used herein, the term "application layer gateway" refers to a voice over internet protocol (VoIP) signaling application layer gateway, for example, a session initiation protocol (SIP) application layer gateway (ALG) that augments a network address translation (NAT) employed in a network such as a computer network. In computer networking, NAT is a process of modifying internet protocol (IP) address information in IPv4 headers while forwarding, for example, SIP messages across a network path. Also, as used herein, the term "communications service provider" refers to a consumer VoIP service provider, for example, an internet telephony service provider that provides an internet data service for making calls using VoIP technology and manages and manages voice communications and multimedia sessions over internet protocol (IP) networks such as the internet. The application layer gateway is a network node provided in the home router of a subscriber of the communications service provider. The home router is a device that forwards data packets between communication networks. As used herein, the term "subscriber" refers to a user who has subscribed to one or more communications services provided by the communications service provider. The application layer gateway is equipped for interfacing a communications network with another communications network using different protocols. The analog telephone adapter is a device used to connect one or more standard analog telephones to a digital telephone system, for example, a VoIP system or a non-standard telephone system.

The method disclosed herein provides 101 a communication management application in the analog telephone adapter. The communication management application is executable by at least one processor configured to detect, process, and augment one or more media messages sent by a first user device to a second user device via the communications service provider along the network path. As used herein, the term "media message" refers to a communications message or a session initiation protocol (SIP) message, for example, a voice message, a fax, a short message service (SMS) message, etc. Also, as used herein the term "first user device" refers to an analog telephone device, for example, a plain old telephone system (POTS) connected to a telephone network. The telephone network is a network that connects exchanges, switches, etc., for example, a wired telephony network, a wireless network, a voice call network, a signaling system number 7 (SS7) network, etc. Also, as used herein the term "second user device" refers to a linear electronic device or a non-linear electronic device, for example, a personal computer, a tablet computing device, a mobile computer, a mobile phone, a smart phone, a portable computing device, a laptop, a personal digital assistant, a touch centric device, a workstation, a client device, a portable electronic device, a network enabled computing device, an interactive network enabled communication device, any other suitable computing equipment, and combinations of multiple pieces of computing equipment, etc. In an embodiment, the communication management application is developed using common high level programming languages, for example, C, C++, etc., or using scripting languages such as Perl or hypertext preprocessor (PHP).

The analog telephone adapter is in operative communication with the first user device via a telephone network. The analog telephone adapter is also in operative communication with the communications service provider via a network. The network is, for example, the internet, an intranet, a wired network, a wireless network, a network that implements Wi-Fi® of the Wireless Ethernet Compatibility Alliance, Inc., an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long term evolution (LTE) mobile communication network, a public telephone network, etc., a local area network, a wide area network, an internet connection network, an infrared communication network, etc., or a network formed from any combination of these networks.

The method disclosed herein also provides 102 a message echo server comprising at least one processor configured to process and scramble a communications protocol message for detecting the presence of the application layer gateway in the network path between the analog telephone adapter and the communications service provider. The message echo server is, for example, an echo server running a message echoing service configured to test and measure round trip times in internet protocol (IP) networks. As used herein, the term "communications protocol message" refers to a signaling message, for example, a plain session initiation protocol (SIP) message such as INVITE or REGISTER. The message echo server is in operative communication with the communication management application in the analog telephone adapter via the network.

The communication management application transmits 103 the communications protocol message in the analog telephone adapter to the message echo server via the network for scrambling the communications protocol message. The communications protocol message comprises a transport address for identifying the first user device. As used herein, the term "transport address" refers to an address, for example, an internet protocol (IP) address used to label a user device such as a computer or a printer participating in a computer network that uses the IP for communication. The transport address is used to identify a network interface and also for location addressing. The message echo server scrambles 104 the transmitted communications protocol message, for example, using a scrambling algorithm as disclosed in the detailed description of FIG. 4. The message echo server then transmits 105 the scrambled communications protocol message to the communication management application in the analog telephone adapter via the network. The communication management application in the analog telephone adapter receives 106 the scrambled communications protocol message from the message echo server via the network and unscrambles 107 the received communications protocol message, for example, using an unscrambling algorithm as disclosed in the detailed description of FIG. 4.

The communication management application in the analog telephone adapter compares 108 the transport address of the unscrambled communications protocol message with the transport address of the original communications protocol message. The communication management application in the analog telephone adapter detects 109 the presence of the application layer gateway (ALG) in the network path between the analog telephone adapter and the communications service provider, when the comparison of the transport address of the unscrambled communications protocol message with the transport address of the original communications protocol message results in a mismatch. Since the communications protocol message returned from the message echo server to the analog telephone adapter is scrambled, the ALG, that is, the SIP ALG, if present, will not recognize the returned communications protocol message because the communications protocol message does not resemble a valid SIP message due to the scrambling.

Figure 2:
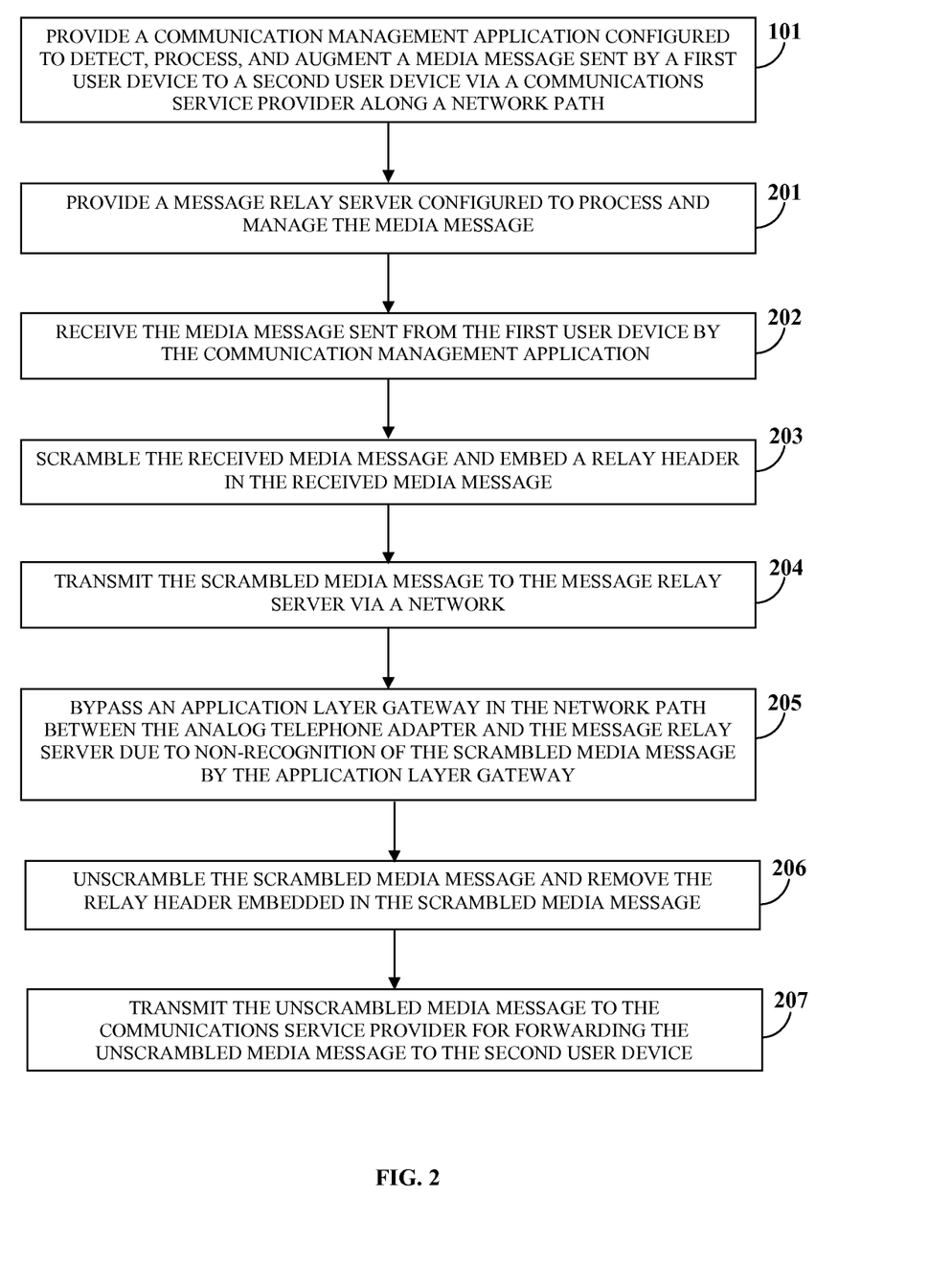
FIG. 2 illustrates a method for transmitting a media message by bypassing an application layer gateway in the network path between an analog telephone adapter and a communications service provider.

FIG. 2 illustrates a method for transmitting a media message by bypassing the application layer gateway (ALG), for example, the session initiation protocol (SIP) ALG in the network path between the analog telephone adapter and the communications service provider. The method disclosed herein provides 101 the communication management application for detecting, processing, and augmenting one or more media messages sent from the first user device to the second user device via the communications service provider along the network path as disclosed in the detailed description of FIG. 1. The method disclosed herein further provides 201 a message relay server comprising at least one processor configured to process and manage the media messages sent between the analog telephone adapter and the communications service provider via the network. The message relay server runs a message relaying service configured to enable secure and load balanced communication between communication devices through the network. The communications service provider is in operative communication with the second user device. The communication management application in the analog telephone adapter receives 202 a media message sent from the first user device. In an embodiment, the communication management application in the analog telephone adapter detects the presence of the ALG in the network path between the analog telephone adapter and the communications service provider using the message echo server as disclosed in the detailed description of FIG. 1.

The communication management application in the analog telephone adapter then scrambles 203 the received media message. The communication management application embeds a relay header in the received media message. The relay header indicates a destination transport address for identifying the second user device. In an embodiment, the communication management application in the analog telephone adapter augments the media message by including checksums in the media message. The checksum also referred to as hash sum is a small size datum computed from an arbitrary block of digital data for detecting errors that may have been introduced during transmission or storage of the media message. The communication management application adds checksums to the media message to facilitate detection of a modification of the media message due to the presence of the application layer gateway in the network path between the analog telephone adapter and the communications service provider, by the communications service provider.

The communication management application in the analog telephone adapter transmits 204 the scrambled media message to the message relay server via the network. The non-recognition of the scrambled media message by the application layer gateway (ALG) results in bypassing 205 of the ALG in the network path between the analog telephone adapter and the message relay server. The message relay server unscrambles 206 the scrambled media message. The message relay server removes the relay header embedded in the scrambled media message. The message relay server transmits 207 the unscrambled media message to the communications service provider for forwarding the unscrambled media message to the second user device. In an embodiment, the communication management application in the analog telephone adapter optionally authenticates the analog telephone adapter to the message relay server prior to forwarding the media message to the second user device by the message relay server. In another embodiment, the analog telephone adapter can be expanded to include a security model that requires the client analog telephone adapter to authenticate to the message relay server before the media messages are forwarded by the message relay server to the final destination. For example, the relay header embedded in the media message sent from the analog telephone adapter to the message relay server comprises authorization information, for example, a user identifier and a cryptographic hash function such as a MD5 hash of the media message concatenated with a password. The relay header sent from the message relay server indicates an error code to the analog telephone adapter if the authorization information is invalid or missing from the last media message.

Figure 3:
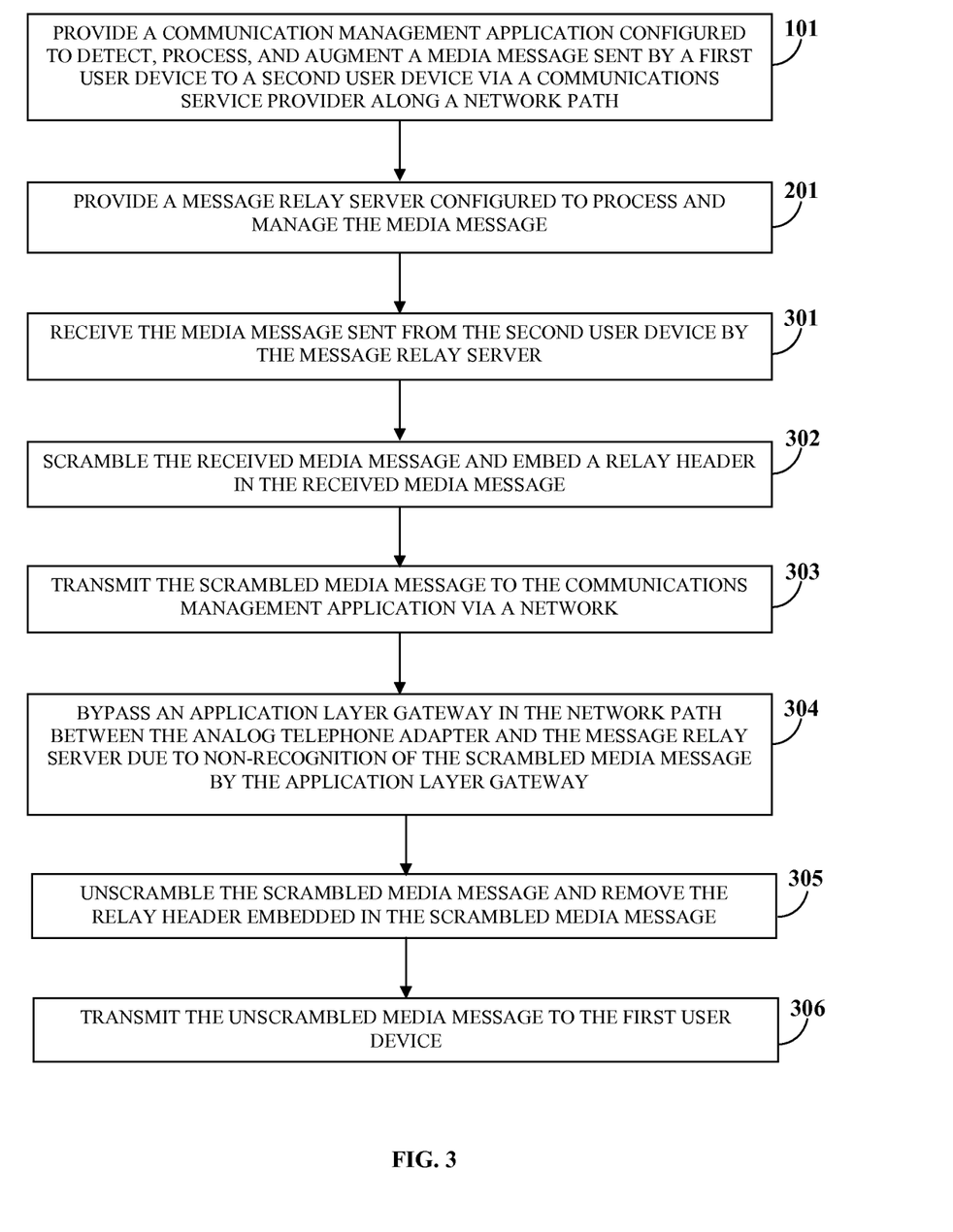
FIG. 3 illustrates an embodiment of the method for transmitting a media message by bypassing an application layer gateway in a network path between an analog telephone adapter and a communications service provider.

FIG. 3 illustrates an embodiment of the method for transmitting a media message by bypassing the application layer gateway (ALG) in the network path between the analog telephone adapter and the communications service provider. The method disclosed herein provides 101 the communication management application for detecting, processing, and augmenting one or more media messages as disclosed in the detailed description of FIG. 1. The method disclosed herein also provides 201 the message relay server for processing and managing the media messages as disclosed in the detailed description of FIG. 2. The communications service provider returns the media messages to the first user device via the analog telephone adapter by retracing the network path in reverse. The message relay server receives 301 the media message returned from the communications service provider. The message relay server scrambles 302 the received media message using a scrambling algorithm as disclosed in the detailed description of FIG. 4. The message relay server embeds a relay header in the received media message during the scrambling process. The relay header indicates a destination transport address for identifying the first user device. The relay header indicates the original source transport address. The message relay server transmits 303 the scrambled media message to the communication management application in the analog telephone adapter via the network. In an embodiment, the communication management application in the analog telephone adapter optionally authenticates the analog telephone adapter to the message relay server prior to transmission of the scrambled media message to the communication management application in the analog telephone adapter by the message relay server. The non-recognition of the scrambled media message by the ALG results in bypassing 304 of the ALG in the network path between the analog telephone adapter and the message relay server. The communication management application in the analog telephone adapter unscrambles 305 the scrambled media message using the unscrambling algorithm as disclosed in the detailed description of FIG. 4. The communication management application removes the relay header embedded in the scrambled media message. The communication management application in the analog telephone adapter then transmits 306 the unscrambled media message to the first user device.

Figure 4:
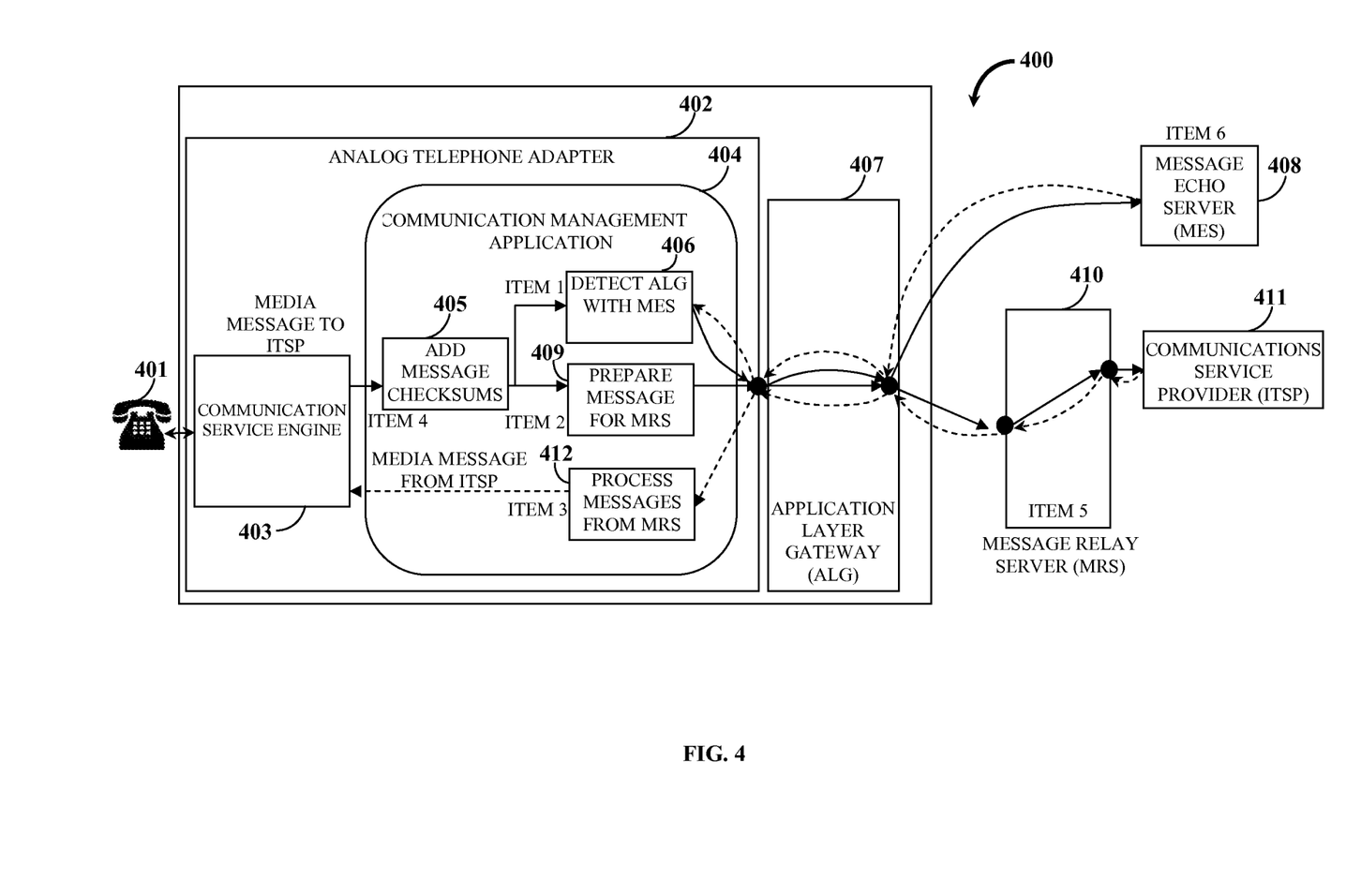
FIG. 4 exemplarily illustrates a process flow diagram showing the steps performed by the analog telephone adapter for detecting and bypassing an application layer gateway in a network path between an analog telephone adapter and a communications service provider.

FIG. 4 exemplarily illustrates a process flow diagram showing the steps performed by the analog telephone adapter 402 for detecting and bypassing the application layer gateway (ALG) 407 in the network path between the analog telephone adapter 402 and the communications service provider 411. FIG. 4 also exemplarily illustrates a system 400 for detecting and bypassing the ALG 407 in the network path between the analog telephone adapter 402 and the communications service provider 411. The system 400 disclosed herein comprises the communication management application 404 in the analog telephone adapter 402, the message echo server 408, and the message relay server 410. The analog telephone adapter 402 incorporates the communication management application 404 with a communication service engine 403, for example, a voice over internet protocol (VoIP) service engine. The ALG 407 is implemented between the analog telephone adapter 402 and the message echo server 408 and the message relay server 410. The message relay server 410 is in operative communication with the communications service provider 411. In an embodiment, the message relay server 410 and the message echo server 408 are implemented in a cloud computing environment comprising a cloud computing platform, for example, PC Backup™ of MyPCBackup, Ltd., Amazon EC2 of Amazon Technologies Inc., GoGrid® of GoGrid, LLC, and the Rackspace® cloud of Rackspace US, Inc. In another embodiment, the message echoing service of the message echo server 408 and the message relaying service of the message relay server 410 are implemented as software applications running on a server, for example, a Linux server.

The communication management application 404 in the analog telephone adapter 402 detects 406 the presence of the application layer gateway (ALG) 407, for example, a session initiation protocol application layer gateway (SIP ALG) in the network path between the analog telephone adapter 402 and the communications service provider 411 such as an internet telephone service provider. The communication management application 404 relies on the message echo server 408 for the detection test. To detect 406 if the ALG 407 is in play, the communication management application 404 in the analog telephone adapter 402 sends a communications protocol message, for example, a SIP message to the message echo server 408. The message echo server 408 scrambles the communications protocol message and returns the scrambled communications protocol message to the analog telephone adapter 402. The communication management application 404 in the analog telephone adapter 402 then unscrambles the communications protocol message and compares the unscrambled communications protocol message with the original communications protocol message to verify if any embedded transport address has been modified and how the transport address has been modified.

In order to assist the communications service provider 411 in detecting if the application layer gateway (ALG) 407 is in play, the communication management application 404 in the analog telephone adapter 402 appends 405 an additional header, for example, X-MD5-Hash in the communications protocol message such as the session initiation protocol (SIP) message sent to the communications service provider 411. The additional header comprises a checksum of the current communications protocol message. The checksum, that is, the MD5-hash value is computed for portions of the original communications protocol message or over the entire communications protocol message that is being sent. For example, each checksum can compute a hash of the message headers and computer another hash of the message body. The checksums are included in a SIP extension header in the final media message. The communications service provider 411, on receiving the augmented communications protocol message, computes a similar checksum or a MD5-Hash over the received communications protocol message. The communications service provider 401 compares the computed hash value with the hash of the received communications protocol message to detect if the message has been modified by an intermediary device, for example, the ALG 407. If the two hashes match, then the media message is not modified by any intermediary.

A first user device 401 sends a media message to a second user device (not shown) via the analog telephone adapter 402 and the communications service provider 411. The analog telephone adapter 402 utilizes the message relaying service via the message relay server 410 to send the media message to the communications service provider 411. A post-processing step, before the outgoing media message leaves the analog telephone adapter 402, prepares 409 the media message. During the post-processing step, the communication management application 404 in the analog telephone adapter 402 scrambles the media message and embeds a relay header in the scrambled media message to indicate the final destination transport address at the communications service provider 411. The post-processed scrambled media message is then sent to the message relay server 410 to be relayed to the communications service provider 411. Returned messages from the communications service provider 411 to the analog telephone adapter 402 are also relayed via the message relay server 410.

When the analog telephone adapter 402 receives a returned media message from the message relay server 410, the communication management application 404 in the analog telephone adapter 402 processes 412 the returned media message using a pre-processing step before the returned media message is passed to the communication service engine 403 for handling. The pre-processing step removes the relay header embedded in the returned media message, unscrambles the returned media message, and forwards the unscrambled media message to the first user device 401. In an embodiment, the analog telephone adapter 402, the message relay server 410, and the message echo server 408 utilize the same scrambling algorithm and the same unscrambling algorithm, as long as the application layer gateway (ALG) 407 is not triggered. For example, scrambling and unscrambling is performed by inverting the bits of each byte in the media message, that is, flipping each bit of each 8-bit character in the original media message. During the scrambling process, the 1-bits are replaced with 0s and the 0-bits are replaced with 1s. Mathematically, this process is represented by: $y[i]=x[i] \wedge 255$ for $i=0, 1, \ldots, N-1$, where N is the number of characters in the media message, x is the input, y is the output, and the symbol "$\wedge$" is the bit-wise exclusive-OR operator. The reverse process occurs during unscrambling, that is, the 0-bits are replaced with 1s and the 1-bits are replaced with 0s.

In an embodiment, the communications service provider 411 deploys the analog telephone adapter 402 incorporated with the communication management application 404 to facilitate the detection of the application layer gateway (ALG) 407 and to bypass the ALG 407 in the home router of the subscriber. In an embodiment, the message echo server 408 and the message relay server 410 are deployed by the communications service provider 411 or by a third party, for example, the analog telephone adapter manufacturer. The message echo server 408 and the message relay server 410 are not tied to a communications service provider 411 and can serve analog telephone adapters 402 belonging to many different communications service providers 411. If the message relay server 410 is provided by the communications service provider 411, then the message relay server 410 can be implemented as a software module, for example, in a voice over internet protocol (VoIP) server that services the analog telephone adapters 402. In an embodiment, the communication management application 404 is incorporated into an existing analog telephone adapter 402 or a similar device to allow the existing analog telephone adapter 402 or the similar device to bypass the ALG 407. In another embodiment, the communication management application 404 is incorporated into new analog telephone adapters 402 or is delivered as a firmware update on the existing analog telephone adapters already in deployment.

Figure 5:
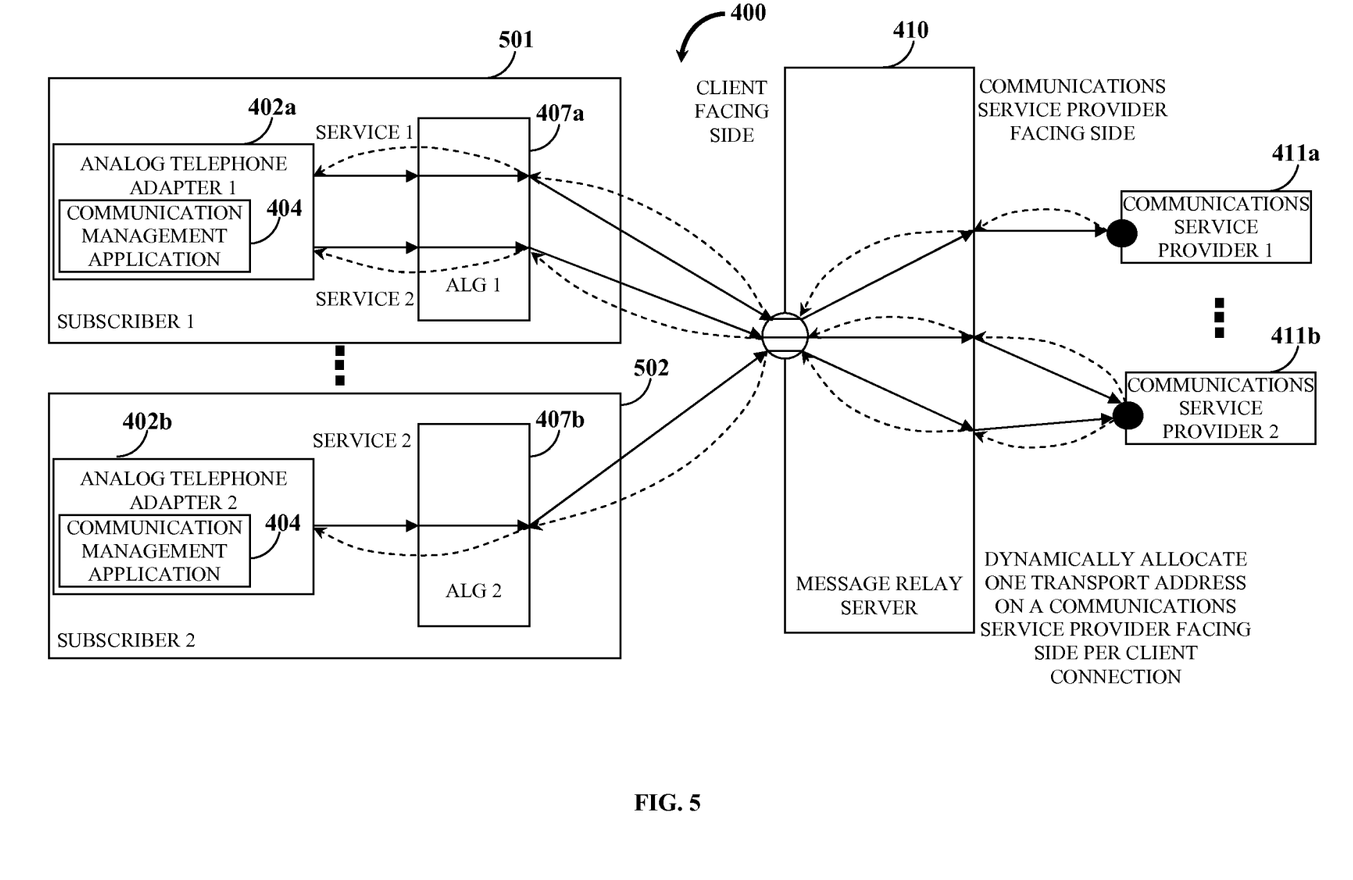
FIG. 5 exemplarily illustrates a system showing a relay of media messages between two analog telephone adapters and two communications service providers on three client connections.

FIG. 5 exemplarily illustrates the system 400 showing a relay of media messages between two subscribers 501 and 502 using two analog telephone adapters 402a and 402b, two application layer gateways (ALGs) 407a and 407b, and two communications service providers 411a and 411b on three client connections. The system 400 disclosed herein detects and bypasses the ALGs 407a and 407b while transmitting media messages sent from the subscribers 501 and 502. The system 400 disclosed herein bypasses the ALGs 407a and 407b by scrambling the media messages and sending the scrambled media messages to the message relay server 410 via the network, for example, the internet. The analog telephone adapters 402a and 402b scramble each media message, add a relay header to each media message, and send each media message to the message relay server 410 as disclosed in the detailed descriptions of FIG. 2 and FIG. 4. The relay header indicates the final destination transport address where the message relay server 410 should forward each media message. In an embodiment, each scrambled media message includes an extra relay header that indicates the final destination transport address of the target recipient or the second user device. The message relay server 410 then removes the relay header and unscrambles each media message, before forwarding each media message to the final destination. The scrambled media message is not recognizable by the ALGs 407a and 407b as a SIP message.

The analog telephone adapters 402a and 402b are regarded as clients of the message relay server 410. The communications service providers 411a and 411b return media messages to the analog telephone adapters 402a and 402b by retracing the path in reverse where the media messages are received from the analog telephone adapters 402a and 402b. With the message relay server 410 inserted in the path, the returned media messages are first sent to the message relay server 410. The message relay server 410 maintains state information about the client analog telephone adapters 402a and 402b such that the returned media messages from the communications service providers 411a and 411b can be routed back to the analog telephone adapters 402a and 402b also by retracing the path in reverse where the media messages are received from the analog telephone adapters 402a and 402b. The message relay server 410 scrambles the returned media message and embeds an additional relay header that indicates the original source transport address before forwarding the media messages to the analog telephone adapters 402a and 402b. The analog telephone adapters 402a and 402b remove the relay header and unscramble the media messages as disclosed in the detailed description of FIG. 3 and FIG. 4.

For optimization purposes, the analog telephone adapters 402a and 402b detect the presence of application layer gateways (ALGs) 407a and 407b in the network path before utilizing the message relaying service via the message relay server 410. The media messages exchanged between the analog telephone adapters 402a and 402b and the message relay server 410 are scrambled. For purposes of illustration, the detailed description refers to a method and a system 400 that transmits session initiation protocol (SIP) messages between the analog telephone adapters 402a and 402b and the communications service providers 411a and 411b; however the scope of the method and the system 400 disclosed herein is not limited to the transmission of SIP messages but can be adapted to transmit other types of media messages and communications protocol messages. Furthermore, for purposes of illustration, the detailed description refers to a method and a system 400 that detect and bypass an SIP ALG gateway; however the scope of the method and the system 400 disclosed herein is not limited to the detection and bypassing of the SIP ALG gateway but can be extended to include services that involve a device behind a home router communicating with a server in a cloud computing environment using a standard protocol such as a session initiation protocol that has peer transport addresses embedded in the media messages.

In an embodiment, the message relay server 410 is implemented as a farm of servers. In another embodiment, the message relay server 410 is implemented as a single server with one or more public internet protocol (IP) addresses. The message relay server 410 has a communications service provider-facing side for communicating with the communications service providers 411a and 411b and a client-facing side for communicating with the analog telephone adapters 402a and 402b. The two sides use different transport addresses to communicate with their respective peers. The message relay server 410 listens for client media messages or packets on one or more message relay server listening transport addresses on the client-facing side. Multiple transport addresses are used to facilitate load-balancing and redundancy. The analog telephone adapters 402a and 402b obtain a list of message relay server listening transport addresses via a domain name system (DNS) query or by static configuration. When the analog telephone adapters 402a and 402b send media messages to a message relay server listening transport address for the first time, the message relay server 410 allocates a new message relay server forwarding transport address on the communications service provider-facing side for forwarding the media message and subsequent media messages from the analog telephone adapters 402a and 402b to the respective final destinations of the media messages.

The message relay server 410 maintains a client state object for each client connection with the analog telephone adapters 402a and 402b. The client state object comprises: the message relay server listening transport address where the media messages are received at the message relay server 410, the client transport address where the media messages are sent from the analog telephone adapters 402a and 402b, the message relay server forwarding transport address allocated on the communications service provider-facing side for forwarding messages from the client analog telephone adapters 402a and 402b, a communications service provider transport address for each distinct final destination transport address the message relay server 410 has forwarded a media message to for the client analog telephone adapters 402a and 402b, and an expiration timer for each communications service provider transport address. The timer is refreshed every time a media message is sent from the client transport address to the communications service provider transport address, or from the communications service provider transport address to the client transport address. When the transport address timers of the communications service provider expire, the client state object is removed from the message relay server 410.

When a media message is received on the client-facing side of the message relay server 410, the message relay server 410 looks up the client state object by matching the source transport address (SRC-TA) and destination transport address (DST-TA) of the media message against the client transport address and message relay server listening transport address of each client state object. If a match is not found, a new client state object is created with a new message relay server forwarding transport address allocated. The message relay server 410 removes the relay header, unscrambles the media message, and forwards the media message to the final destination from the allocated message relay server forwarding transport address. When a media message is received on the communications service provider-facing side of the message relay server 410, the message relay server 410 looks for the client state object whose message relay server forwarding transport address equals to the destination transport address of the media message. The media message is dropped if the client state object is not found or if the source transport address of the media message does not match any communications service provider transport address in the client state object. Otherwise, the message relay server 410 scrambles the media message, adds a relay header, and forwards the media message to the client transport address from the message relay server listening transport address. The relay header indicates the matching communications service provider transport address as the originating transport address of the message.

For purposes of illustration, the detailed description refers to a method and a communications management system 400 implemented using a user datagram protocol (UDP) implementation; however the scope of the method and the communications management system 400 disclosed herein is not limited to the UDP based implementation but may be extended to adapt to a transmission control protocol (TCP) based implementation or any other standard protocol based implementation. To support network address translation (NAT)/firewall (FW) traversal over UDP, the analog telephone adapters 402a and 402b and the communications service providers 411a and 411b use the same transport address at each end for sending and receiving media messages when communicating with each other. The analog telephone adapters 402a and 402b have to send media messages to the communications service providers 411a and 411b, before the communications service providers 411a and 411b can return the media messages to the analog telephone adapters 402a and 402b. The communications service providers 411a and 411b send media messages to the analog telephone adapters 402a and 402b at the transport addresses where media messages from the analog telephone adapters 402a and 402b are sent from. The source transport address where the media messages are sent from and the destination transport address where the media messages are sent to are stored in the internet protocol header of each media message. The transport address at the analog telephone adapter side and the transport address at the communications service provider side form a UDP connection. This UDP connection is used by both the peers, that is, the analog telephone adapters 402a and 402b and the communications service providers 411a and 411b to send and receive media messages throughout the session. The analog telephone adapters 402a and 402b and the communications service providers 411a and 411b send a media message from time to time to refresh the network connections to prevent the home routers implementing the application layer gateways (ALGs) 407a and 407b from closing the network path after a long idle interval.

Figure 6:
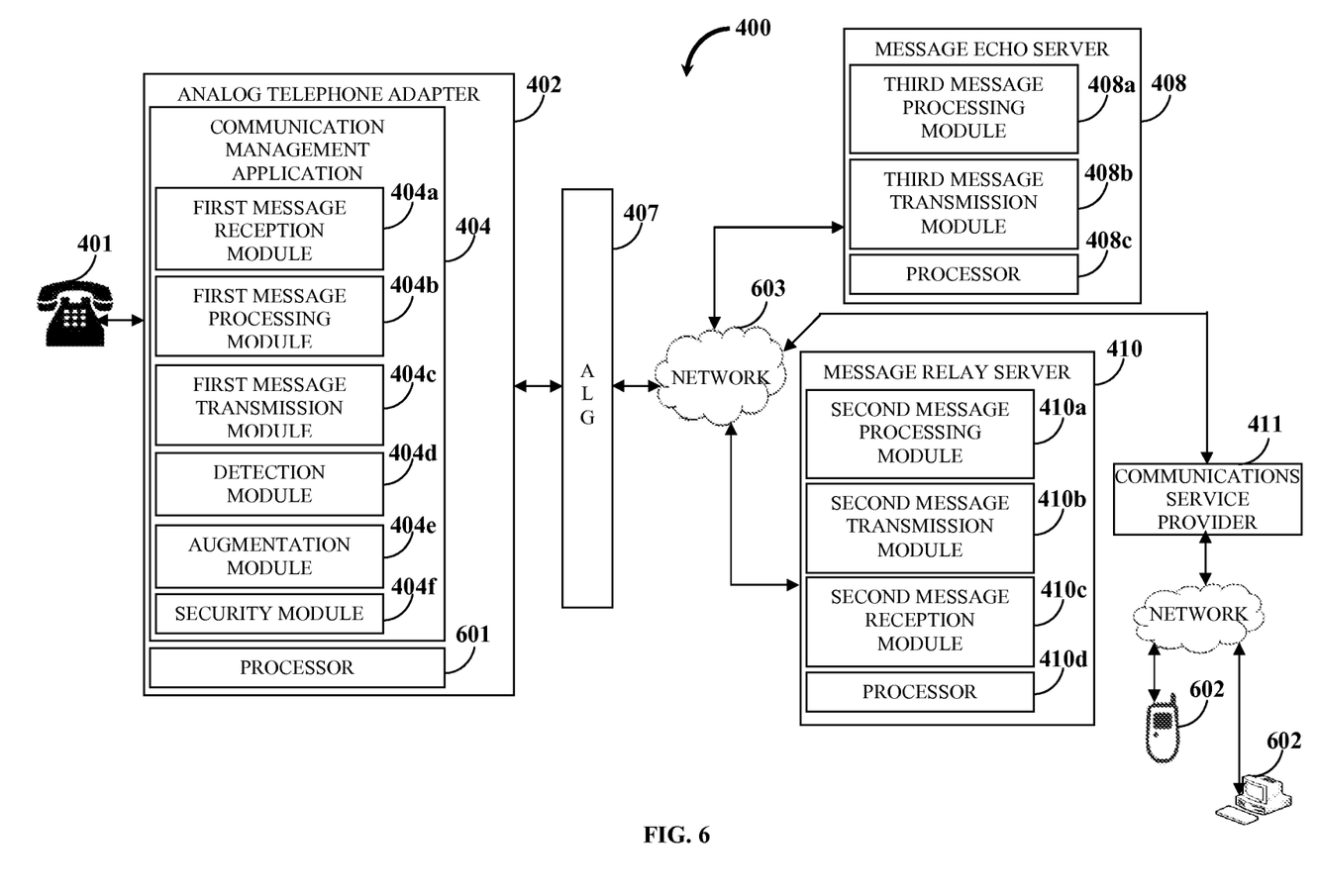
FIG. 6 illustrates a system for transmitting a media message by bypassing an application layer gateway in a network path between an analog telephone adapter and a communications service provider.

FIG. 6 illustrates a system 400 for transmitting a media message by bypassing the application layer gateway (ALG) 407 in the network path between the analog telephone adapter 402 and the communications service provider 411. The system 400, also referred to as the "communications management and gateway bypassing system", comprises the analog telephone adapter 402 in operative communication with a first user device 401 and the communications service provider 411. The analog telephone adapter 402 comprises at least one processor 601, a non-transitory computer readable storage medium communicatively coupled to the processor 601, and the communication management application 404. The term "processor" refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. As used herein, the term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 601, except for a transitory, propagating signal. The non-transitory computer readable storage medium of the analog telephone adapter 402 stores the modules 404a, 404b, 404c, 404d, 404e, and 404f of the communication management application 404.

The communication management application 404 comprises a first message reception module 404a, a first message processing module 404b, and a first message transmission module 404c. The first message reception module 404a receives the media message sent from the first user device 401. The first message processing module 404b scrambles the received media message and embeds a relay header in the received media message. The relay header indicates a destination transport address for identifying the second user device 602. The first message transmission module 404c transmits the scrambled media message to the message relay server 410 via the network 603. The scrambled media message is not recognized by the ALG 407. The non-recognition of the scrambled media message by the ALG 407 in the network path between the analog telephone adapter 402 and the message relay server 410 results in bypassing of the ALG 407.

The message relay server 410 is in operative communication with the analog telephone adapter 402 via the network 603. The message relay server 410 comprises at least one processor 410d and a non-transitory computer readable storage medium communicatively couple to the processor 410d. The non-transitory computer readable storage medium of the message relay server 410 stores modules 410a, 410b, and 410c of the message relay server 410. The message relay server 410 further comprises a second message processing module 410a, and a second message transmission module 410b. The second message processing module 410a unscrambles the scrambled media message and removes the relay header embedded in the scrambled media message. The second message transmission module 410b transmits the unscrambled media message to the communications service provider 411 for forwarding the unscrambled media message to the second user device 602.

In an embodiment, the system 400 disclosed herein further comprises a message echo server 408 configured to process and scramble a communications protocol message for detecting the presence of the application layer gateway (ALG) 407 between the analog telephone adapter 402 and the communications service provider 411. The message echo server 408 is in operative communication with the communication management application 404 in the analog telephone adapter 402 via the network 603. The message echo server 408 comprises at least one processor 408c and a non-transitory computer readable storage medium communicatively coupled to the processor 408c. The non-transitory computer readable storage medium of the message echo server 408 stores modules 408a and 408b of the message echo server 408. The message echo server 408 further comprises a third message processing module 408a and a third message transmission module 408b. The third message processing module 408a scrambles a communications protocol message transmitted by the first message transmission module 404c of the communication management application 404 via the network 603. The communications protocol message comprises a transport address configured to identify the first user device 401. The third message transmission module 408b transmits the scrambled communications protocol message to the communication management application 404 of the analog telephone adapter 402 via the network 603. The first message processing module 404b of the communication management application 404 is further configured to unscramble the transmitted communications protocol message.

The communication management application 404 of the analog telephone adapter 402 further comprises a detection module 404d, an augmentation module 404e, and a security module 404f. The detection module 404d compares the transport address of the unscrambled communications protocol message with the transport address of the original communications protocol message and detects the presence of the application layer gateway (ALG) 407 in the network path between the analog telephone adapter 402 and the communications service provider 411, when the comparison of the transport address of the unscrambled communications protocol message with the transport address of the original communications protocol message results in a mismatch. The augmentation module 404e augments the media message by including checksums in the media message to facilitate detection of a modification of the media message due to the presence of the ALG 407 in the network path between the analog telephone adapter 402 and the communications service provider 411. The security module 404f authenticates the analog telephone adapter 402 to the message relay server 410 prior to forwarding of the media message to the second user device 602 by the message relay server 410.

The message relay server 410 further comprises a second message reception module 410c for receiving the media message sent from the second user device 602. The second message processing module 410a of the message relay server 410 scrambles the received media message and embeds a relay header in the received media message. The relay header indicates a destination transport address for identifying the first user device 401. The second message transmission module 410b of the message relay server 410 transmits the scrambled media message to the communication management application 404 in the analog telephone adapter 402 via the network 603. The first message processing module 404b of the communication management application 404 unscrambles the scrambled media message and removes the relay header embedded in the scrambled media message. The first message transmission module 404c of the communication management application 404 transmits the unscrambled media message to the first user device 401. In an embodiment, the security module 404f authenticates the analog telephone adapter 402 to the message relay server 410 prior to transmission of the scrambled media message to the communication management application 404 by the message relay server 410.

The processor 601 of the analog telephone adapter 402 retrieves instructions defined by the first message reception module 404a, the first message processing module 404b, the first message transmission module 404c, the detection module 404d, the augmentation module 404e, and the security module 404f, and executes the instructions, thereby performing one or more processes defined by those instructions. The processor 410d of the message relay server 410 retrieves instructions defined by the second message reception module 410c, the second message processing module 410a, and the second message transmission module 410b, and executes the instructions, thereby performing one or more processes defined by those instructions. The processor 408c of the message echo server 408 retrieves instructions defined by the third message processing module 408a and the third message transmission module 408b, and executes the instructions, thereby performing one or more processes defined by those instructions. Each of the processors 601, 408c, and 410d may be implemented as a processor set comprising, for example, a general purpose microprocessor and a math or graphics co-processor. The processors 601, 408c, and 410d are selected, for example, from the Intel® processors such as the Itanium® microprocessor or the Pentium® processors, Advanced Micro Devices (AMD®) processors such as the Athlon® processor, ULtraSPARC® processors, microSPARC™ processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc.

Each of the processors 601, 408c, and 410d executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., Palm OS®, the Solaris operating system developed by Sun Microsystems, Inc., the Android operating system, Windows Phone™ operating system of Microsoft Corporation, BlackBerry® operating system of Research in Motion Limited, the iOS operating system of Apple Inc., the Symbian® operating system of Symbian Foundation Limited, etc. The operating system executes different programs using each of the processors 601, 408c, and 410d. Each of the processors 601, 408c, and 410d and the operating system together define a computer platform for which application programs in high level programming languages are written.

It will be readily apparent that the various methods, algorithms, and computer programs disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, JavaScript®, Ruby, Perl®, Python®, etc. Other object-oriented, functional, scripting, and/or logical programming languages may also be used. The computer program codes or software programs may be stored on or in one or more mediums as object code. Various aspects of the method and system disclosed herein may be implemented as programmed elements, or non-programmed elements, or any suitable combination thereof.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices may comprise processors, for example, the Intel® processors, Advanced Micro Devices (AMD®) processors, ULtraSPARC® processors, Hp® processors, International Business Machines (IBM®) processors, RISC based computer processors of ARM Holdings, Motorola® processors, etc., that are adapted to communicate with the computers. In an embodiment, each of the computers is equipped with a network communication device, for example, a network interface card, a modem, or other network connection device suitable for connecting to a network. Each of the computers and the devices executes an operating system, for example, the Linux® operating system, the Unix® operating system, any version of the Microsoft® Windows® operating system, the Mac OS of Apple Inc., the IBM® OS/2, the Palm OS®, the Android® OS, the Blackberry® OS, the Solaris operating system developed by Sun Microsystems, Inc., or any other operating system. Handheld devices execute operating systems, for example, the Android operating system, the Windows Phone™ operating system of Microsoft Corporation, the BlackBerry® operating system of Research in Motion Limited, the iOS operating system of Apple Inc., the Symbian® operating system of Symbian Foundation Limited, etc. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A method for detecting presence of an application layer gateway in a network path between an analog telephone adapter and a communications service provider, said method comprising:
providing a communication management application in said analog telephone adapter, wherein said communication management application is executable by at least one processor configured to detect, process, and augment a media message sent by a first user device to a second user device via said communications service provider along said network path, and wherein said analog telephone adapter is in operative communication with said first user device and said communications service provider;
providing a message echo server comprising at least one processor configured to process and scramble a communications protocol message, said communications protocol message configured to detect said presence of said application layer gateway in said network path between said analog telephone adapter and said communications service provider, wherein said message echo server is in operative communication with said communication management application in said analog telephone adapter via a network;
transmitting said communications protocol message by said communication management application in said analog telephone adapter to said message echo server via said network for scrambling said communications protocol message, wherein said communications protocol message comprises a transport address configured to identify said first user device;
receiving said scrambled communications protocol message from said message echo server by said communication management application in said analog telephone adapter via said network;
unscrambling said received communications protocol message by said communication management application in said analog telephone adapter;
comparing said transport address of said unscrambled communications protocol message with said transport address of original said communications protocol message by said communication management application in said analog telephone adapter; and
detecting said presence of said application layer gateway in said network path between said analog telephone adapter and said communications service provider by said communication management application in said analog telephone adapter, when said comparison of said transport address of said unscrambled communications protocol message with said transport address of said original said communications protocol message results in a mismatch.

2. A method for transmitting a media message by bypassing an application layer gateway in a network path between an analog telephone adapter and a communications service provider, comprising:
providing a communication management application in said analog telephone adapter, wherein said communication management application is executable by at least one processor configured to detect, process, and augment said media message sent by a first user device to a second user device via said communications service provider along said network path, and wherein said analog telephone adapter is in operative communication with said first user device and said communications service provider;
providing a message relay server comprising at least one processor configured to process and manage said media message sent between said analog telephone adapter and said communications service provider via a network, wherein said communications service provider is in operative communication with said second user device;
receiving said media message sent from said first user device by said communication management application in said analog telephone adapter;

scrambling said received media message by said communication management application in said analog telephone adapter, wherein said communication management application is configured to embed a relay header in said received media message, and wherein said relay header is configured to indicate a destination transport address for identifying said second user device;

transmitting said scrambled media message by said communication management application in said analog telephone adapter to said message relay server via said network;

bypassing said application layer gateway in said network path between said analog telephone adapter and said message relay server due to non-recognition of said scrambled media message by said application layer gateway;

unscrambling said scrambled media message by said message relay server, wherein said message relay server is configured to remove said relay header embedded in said scrambled media message; and transmitting said unscrambled media message by said message relay server to said communications service provider for forwarding said unscrambled media message to said second user device.

3. The method of claim 2, further comprising detecting presence of said application layer gateway in said network path between said analog telephone adapter and said communications service provider by said communication management application in said analog telephone adapter by:

providing a message echo server comprising at least one processor configured to process and scramble a communications protocol message, said communications protocol message configured to detect said presence of said application layer gateway between said analog telephone adapter and said communications service provider, wherein said message echo server is in operative communication with said communication management application in said analog telephone adapter via said network;

transmitting said communications protocol message by said communication management application in said analog telephone adapter to said message echo server via said network for scrambling said communications protocol message, wherein said communications protocol message comprises a transport address configured to identify said first user device;

receiving said scrambled communications protocol message from said message echo server by said communication management application in said analog telephone adapter via said network;

unscrambling said received communications protocol message by said communication management application in said analog telephone adapter;

comparing said transport address of said unscrambled communications protocol message with said transport address of original said communications protocol message by said communication management application in said analog telephone adapter; and detecting said presence of said application layer gateway in said network path between said analog telephone adapter and said communications service provider by said communication management application in said analog telephone adapter, when said comparison of said transport address of said unscrambled communications protocol message with said transport address of said original said communications protocol message results in a mismatch.

4. The method of claim 2, further comprising augmenting said media message by including checksums in said media message by said communication management application in said analog telephone adapter to facilitate detection of a modification of said media message due to said presence of said application layer gateway in said network path between said analog telephone adapter and said communications service provider, by said communications service provider.

5. The method of claim 2, further comprising authenticating said analog telephone adapter to said message relay server by said communication management application in said analog telephone adapter prior to forwarding said media message to said second user device by said message relay server.

6. A method for transmitting a media message by bypassing an application layer gateway in a network path between an analog telephone adapter and a communications service provider, comprising:

providing a communication management application in said analog telephone adapter, wherein said communication management application is executable by at least one processor configured to detect, process, and augment said media message sent by a first user device to a second user device via said communications service provider along said network path, and wherein said analog telephone adapter is in operative communication with said first user device and said communications service provider;

providing a message relay server comprising at least one processor configured to process and manage said media message sent between said analog telephone adapter and said communications service provider via a network, wherein said communications service provider is in operative communication with said second user device;

receiving said media message returned from said communications service provider by said message relay server;

scrambling said received media message by said message relay server, wherein said message relay server is configured to embed a relay header in said received media message, and wherein said relay header is configured to indicate a destination transport address for identifying said first user device;

transmitting said scrambled media message by said message relay server to said communication management application in said analog telephone adapter via said network;

bypassing said application layer gateway in said network path between said analog telephone adapter and said message relay server due to non-recognition of said scrambled media message by said application layer gateway;

unscrambling said scrambled media message by said communication management application in said analog telephone adapter, wherein said communication management application is configured to remove said relay header embedded in said scrambled media message; and transmitting said unscrambled media message by said communication management application in said analog telephone adapter to said first user device.

7. The method of claim 6, further comprising authenticating said analog telephone adapter to said message relay server by said communication management application in said analog telephone adapter prior to said transmission of said scrambled media message to said communication management application in said analog telephone adapter by said message relay server.

8. A system for transmitting a media message by bypassing an application layer gateway in a network path between an analog telephone adapter and a communications service provider, comprising:
- said analog telephone adapter in operative communication with a first user device and said communications service provider, said analog telephone adapter comprising:
  - at least one first processor;
  - a first non-transitory computer readable storage medium communicatively coupled to said at least one first processor, said first non-transitory computer readable storage medium configured to store a communication management application;
  - said communication management application executable by said at least one processor configured to detect, process, and augment said media message sent by said first user device to a second user device via said communications service provider along said network path, said communication management application comprising:
    - a first message reception module configured to receive said media message sent from said first user device;
    - a first message processing module configured to scramble said received media message and embed a relay header in said received media message, said relay header configured to indicate a destination transport address for identifying said second user device; and
    - a first message transmission module configured to transmit said scrambled media message to a message relay server via a network, wherein non-recognition of said scrambled media message by said application layer gateway results in bypassing of said application layer gateway in said network path between said analog telephone adapter and said message relay server; and
- said message relay server in operative communication with said analog telephone adapter via said network, said message relay server comprising:
  - at least one second processor;
  - a second non-transitory computer readable storage medium communicatively coupled to said at least one second processor, said second non-transitory computer readable storage medium configured to store modules of said message relay server;
  - a second message processing module configured to unscramble said scrambled media message and remove said relay header embedded in said scrambled media message; and
  - a second message transmission module configured to transmit said unscrambled media message to said communications service provider for forwarding said unscrambled media message to said second user device.

9. The system of claim 8, further comprising a message echo server configured to process and scramble a communications protocol message, said communications protocol message configured to detect said presence of said application layer gateway between said analog telephone adapter and said communications service provider, wherein said message echo server is in operative communication with said communication management application in said analog telephone adapter via said network, and wherein said message echo server comprises:
- at least one third processor;
- a third non-transitory computer readable storage medium communicatively coupled to said at least one third processor, said third non-transitory computer readable storage medium configured to store modules of said message echo server;
- a third message processing module configured to scramble a communications protocol message transmitted by said first message transmission module of said communication management application via said network, wherein said communications protocol message comprises a transport address configured to identify said first user device; and
- a third message transmission module configured to transmit said scrambled communications protocol message to said communication management application of said analog telephone adapter via said network, wherein said first message processing module of said communication management application is further configured to unscramble said transmitted communications protocol message.

10. The system of claim 9, wherein said communication management application of said analog telephone adapter further comprises a detection module configured to compare said transport address of said unscrambled communications protocol message with said transport address of original said communications protocol message, and detect said presence of said application layer gateway in said network path between said analog telephone adapter and said communications service provider, when said comparison of said transport address of said unscrambled communications protocol message with said transport address of said original said communications protocol message results in a mismatch.

11. The system of claim 8, wherein said communication management application of said analog telephone adapter further comprises an augmentation module configured to augment said media message by including checksums in said media message to facilitate detection of a modification of said media message due to said presence of said application layer gateway in said network path between said analog telephone adapter and said communications service provider.

12. The system of claim 8, wherein said communication management application of said analog telephone adapter further comprises a security module configured to authenticate said analog telephone adapter to said message relay server prior to forwarding said media message to said second user device by said message relay server.

13. The system of claim 8, wherein said message relay server further comprises a second message reception module configured to receive said media message sent from said second user device, and wherein said second message processing module of said message relay server is further configured to scramble said received media message and embed a relay header in said received media message, wherein said relay header is configured to indicate a destination transport address for identifying said first user device, and wherein said second message transmission module of said message relay server is further configured to transmit said scrambled media message to said communication management application in said analog telephone adapter via said network.

14. The system of claim 13, wherein said first message processing module of said communication management application is further configured to unscramble said scrambled media message and remove said relay header embedded in said scrambled media message, and wherein said first message transmission module of said communication management application is further configured to transmit said unscrambled media message to said first user device.

15. The system of claim 13, wherein said communication management application of said analog telephone adapter further comprises a security module configured to authenticate said analog telephone adapter to said message relay server prior to said transmission of said scrambled media message to said communication management application by said message relay server.

\* \* \* \* \*